United States Patent
Takai (10) Patent No.: US 11,425,207 B2
(45) Date of Patent: Aug. 23, 2022

(54) RECEIVING DEVICE ESTIMATING THAT A COMMUNICATION DEVICE IS IN AN INCOMMUNICABLE STATE

(71) Applicant: Mitsubishi Electric Corporation, Tokyo (JP)

(72) Inventor: Manato Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/251,820

(22) PCT Filed: Aug. 27, 2018

(86) PCT No.: PCT/JP2018/031526
§ 371 (c)(1),
(2) Date: Dec. 14, 2020

(87) PCT Pub. No.: WO2020/044393
PCT Pub. Date: Mar. 5, 2020

(65) Prior Publication Data
US 2021/0258388 A1 Aug. 19, 2021

(51) Int. Cl.
*G06F 15/173* (2006.01)
*H04L 67/145* (2022.01)

(52) U.S. Cl.
CPC .................. *H04L 67/145* (2013.01)

(58) Field of Classification Search
CPC ................................. H04L 67/145
USPC ............................. 709/223–224
See application file for complete search history.

(56) References Cited

U.S. PATENT DOCUMENTS

| 6,003,637 A | 12/1999 | Kim et al. |
| 9,141,489 B2* | 9/2015 | Etchegoyen ........ G06F 11/2025 |
| 9,717,110 B1* | 7/2017 | Gupta ................... H04W 36/03 |

(Continued)

FOREIGN PATENT DOCUMENTS

| CN | 107113101 A | 8/2017 |
| JP | 2003-67264 A | 3/2003 |
| JP | 2017-143385 A | 8/2017 |

OTHER PUBLICATIONS

International Search Report and Written Opinion dated Nov. 13, 2018, received for PCT Application No. PCT/JP2018/031526, Filed on Aug. 27, 2018, 7 pages including English Translation.

(Continued)

*Primary Examiner* — Bharat Barot
(74) *Attorney, Agent, or Firm* — Xsensus LLP (57) ABSTRACT

A receiving device includes processing circuitry to determine timings for generating monitoring-side keep alive signals at same timings as timings when a plurality of communication devices transmit monitored-side keep alive signals, to generate a plurality of monitoring-side keep alive signals at a plurality of timings determined, and to estimate a communication device in an incommunicable state based on a comparison result of a number of monitoring-side keep alive signals generated thereafter and a number of monitored-side keep alive signals received thereafter when the plurality of monitoring-side keep alive signals are generated, if a number of the received monitored-side keep alive signals is smaller than a number of the generated monitoring-side keep alive signals.

3 Claims, 8 Drawing Sheets

(56) References Cited

U.S. PATENT DOCUMENTS

| | | | |
|---|---|---|---|
| 2011/0010560 A1* | 1/2011 | Etchegoyen | H04L 45/28 |
| | | | 709/225 |
| 2016/0204963 A1 | 7/2016 | Abdoli et al. | |
| 2017/0149246 A1* | 5/2017 | Storage | H02J 3/46 |

OTHER PUBLICATIONS

Chinese Office Action dated Nov. 18, 2021, in Chinese Application No. 201880096783.4.

Office Action dated Mar. 7, 2022, in corresponding Chinese patent Application No. 201880096783.4, 15 pages.

* cited by examiner

RECEIVING DEVICE ESTIMATING THAT A COMMUNICATION DEVICE IS IN AN INCOMMUNICABLE STATE

CROSS-REFERENCE TO RELATED APPLICATION

The present application is based on PCT filing PCT/JP2018/031526, filed Aug. 27, 2018, the entire contents of which are incorporated herein by reference.

FIELD

The present invention relates to a receiving device.

BACKGROUND

PTL 1 discloses a monitoring system. With the monitoring system, it is possible to determine a communication state of a communication device.

CITATION LIST

Patent Literature

[PTL 1] JP 2003-067264 A

SUMMARY

Technical Problem

However, in the monitoring system described in PTL 1, a receiving device needs to transmit a confirmation signal to the communication device. Further, the communication device needs to transmit an acknowledgment signal. Accordingly, an amount of data exchanged when the communication state of the communication device is determined increases.

The present invention has been devised in order to solve the problem described above. An object of the present invention is to provide a receiving device that can specify a communication device in an incommunicable state without transmitting a confirmation signal.

Solution to Problem

A receiving device according to the present invention includes: a monitoring-side-timing determining unit configured to determine timings for generating monitoring-side keep alive signals at same timings as timings when a plurality of communication devices transmit monitored-side keep alive signals; a monitoring-side-keep-alive-signal generating unit configured to generate a plurality of monitoring-side keep alive signals at a plurality of timings determined by the monitoring-side-timing determining unit; and an estimating unit configured to, when the monitoring-side-keep-alive-signal generating unit simultaneously generates the plurality of monitoring-side keep alive signals, if a number of the received monitored-side keep alive signals is smaller than a number of the generated monitoring-side keep alive signals, estimate a communication device in an incommunicable state based on a comparison result of a number of monitoring-side keep alive signals generated thereafter and a number of monitored-side keep alive signals received thereafter.

Advantageous Effects of Invention

According to the present invention, if the number of received monitored-side keep alive signal is smaller than the number of generated monitoring-side keep alive signals, the receiving device estimates a communication device in an incommunicable state based on a comparison result of the number of monitoring-side keep alive signals generated thereafter and a number of monitored-side keep alive signals received thereafter. Accordingly, it is possible to specify the communication device in the incommunicable state without transmitting a confirmation signal.

DESCRIPTION OF EMBODIMENTS

Modes for carrying out the present invention are explained with reference to the accompanying drawings. Note that, in the figures, the same or equivalent parts are denoted by the same reference numerals and signs. Repetitive descriptions of the parts are simplified or omitted as appropriate.

First Embodiment

Figure 1:
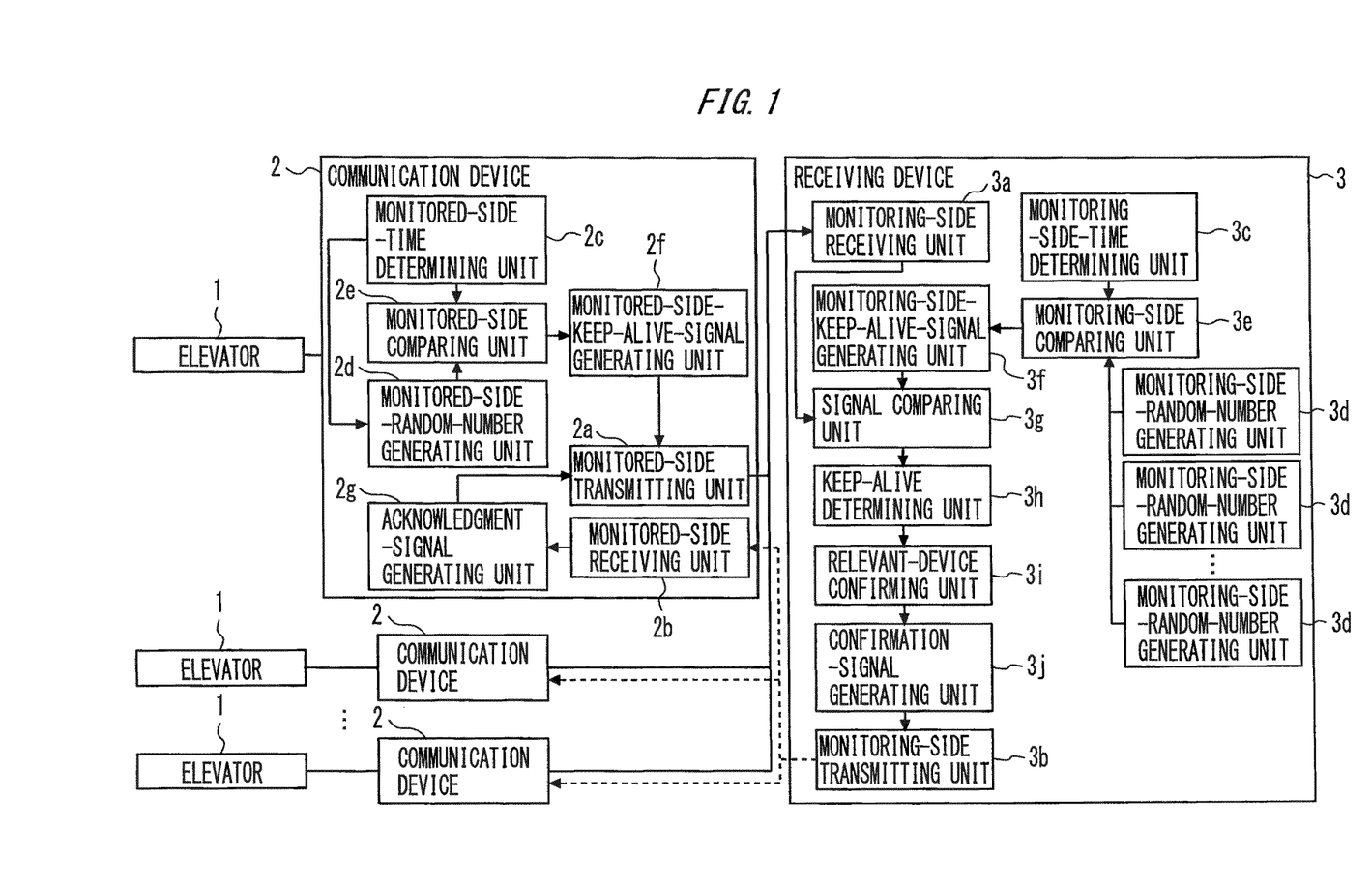
FIG. 1 is a configuration diagram of a monitoring system in a first embodiment.

FIG. 1 is a configuration diagram of a monitoring system in a first embodiment.

For example, a monitoring system is provided to be able to monitor a plurality of elevators 1.

The monitoring system includes a plurality of communication devices 2 and a receiving device 3.

Each of the plurality of communication devices 2 is provided to correspond to each of the plurality of elevators 1. Each of the plurality of communication devices 2 includes a monitored-side transmitting unit 2a, a monitored-side receiving unit 2b, a monitored-side-time determining unit 2c, a monitored-side-random-number generating unit 2d, a monitored-side comparing unit 2e, a monitored-side-keep-alive-signal generating unit 2f and an acknowledgment-signal generating unit 2g.

For example, the receiving device 3 is incorporated into a cloud server. For example, the receiving device 3 is incorporated near the communication devices 2. The receiving device 3 includes a monitoring-side receiving unit 3a, a monitoring-side transmitting unit 3b, a monitoring-side-time determining unit 3c, a plurality of monitoring-side-random-number generating units 3d, a monitoring-side comparing unit 3e, a monitoring-side-keep-alive-signal generating unit 3f, a signal comparing unit 3g, a keep-alive determining unit 3h, a relevant-device confirming unit 3i and a confirmation-signal generating unit 3j.

In each of the plurality of communication devices 2, the monitored-side-time determining unit 2c, the monitored-side-random-number generating unit 2d and the monitored-side comparing unit 2e function as a monitored-side-timing determining unit and determine, by themselves, timing when the monitored-side transmitting unit 2a transmits a monitored-side keep alive signal to the receiving device 3. The monitored-side-keep-alive-signal generating unit 2f generates the monitored-side keep alive signal such that the monitored-side transmitting unit 2a transmits the monitored-side keep alive signal to the receiving device 3 at the determined timing. The monitored-side transmitting unit 2a transmits the monitored-side keep alive signal to the receiving device 3.

In the receiving device 3, the monitoring-side receiving unit 3a receives monitored-side keep alive signals from the plurality of communication devices 2. The monitoring-side-time determining unit 3c, the plurality of monitoring-side-random-number generating units 3d and the monitoring-side comparing unit 3e function as a monitoring-side-timing determining unit and determine timings for generating monitoring-side keep alive signals at the same timings as timings when the plurality of communication devices 2 transmit the monitored-side keep alive signals. The monitoring-side-keep-alive-signal generating unit 3f generates a plurality of monitoring-side keep alive signals at a determined plurality of timings.

The signal comparing unit 3g compares the number of generated monitoring-side keep alive signals and the number of received monitored-side keep alive signals.

The keep-alive determining unit 3h determines the communication device 2 in an incommunicable state based on a comparison result of the signal comparing unit 3g. For example, when the monitoring-side-keep-alive-signal generating unit 3f generates a monitoring-side keep alive signal, if a monitored-side keep alive signal is not received, the keep-alive determining unit 3h determines that the communication device 2 corresponding to the monitoring-side keep alive signal is in the incommunicable state. For example, when the monitoring-side-keep-alive-signal generating unit 3f simultaneously generates a plurality of monitoring-side keep alive signals, if the number of the received monitored-side keep alive signals is smaller than the number of generated monitoring-side keep alive signals, the keep-alive determining unit 3h determines that any one of a plurality of communication devices 2 corresponding to the plurality of monitoring-side keep alive signals is in the incommunicable state.

At this time, the relevant-device confirming unit 3i grasps the plurality of communication devices 2 corresponding to the plurality of monitoring-side keep alive signals. The confirmation-signal generating unit 3j generates a confirmation signal to be transmitted to the plurality of communication devices 2. The monitoring-side transmitting unit 3b transmits the confirmation signal generated by the confirmation-signal generating unit 3j to the plurality of communication devices 2.

In each of the plurality of communication devices 2, the monitored-side receiving unit 2b receives the confirmation signal from the receiving device 3. The acknowledgment-signal generating unit 2g generates an acknowledgment signal when the monitored-side receiving unit 2b receives the confirmation signal. Among the plurality of communication devices 2, in the communication device 2 in the communicable state, the monitored-side transmitting unit 2a transmits the acknowledgment signal to the receiving device 3. In the communication device 2 not in the incommunicable state, the monitored-side transmitting unit 2a does not transmit the acknowledgment signal to the receiving device 3.

In the receiving device 3, the monitoring-side receiving unit 3a receives acknowledgment signals from the plurality of communication devices 2. The receiving device 3 grasps, according to a reception state of the acknowledgment signal, the communication device 2 that becomes incommunicable.

Subsequently, a determining method for timing for transmitting a monitored-side keep alive signal is explained with reference to FIG. 2.

Figure 2:
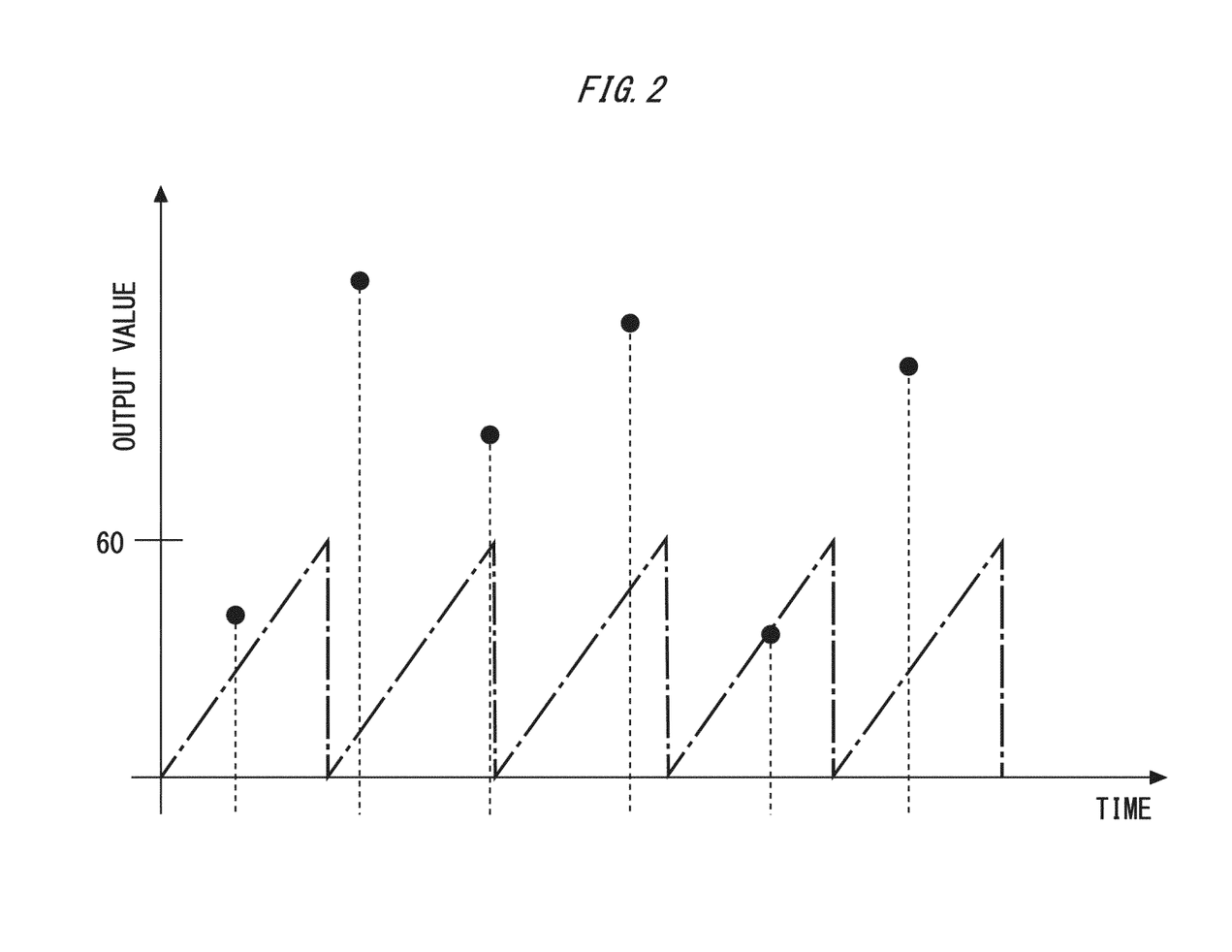
FIG. 2 is a diagram for explaining a determination method for timing for transmitting a monitored-side keep alive signal by a communication device of the monitoring system in the first embodiment.

FIG. 2 is a diagram for explaining a determination method for timing for transmitting a monitored-side keep alive signal by the communication device of the monitoring system in the first embodiment. The horizontal axis of FIG. 2 indicates time. The vertical axis of FIG. 2 indicates an output value of the monitored-side-time determining unit 2c and the monitored-side-random-number generating unit 2d.

In FIG. 2, an alternate long and short dash line represents an output value at only present time by the monitored-side-time determining unit 2c. Dots represent output values of the monitored-side-random-number generating unit 2d.

The monitored-side-random-number generating unit 2d outputs signals at fixed intervals. If an output value at this time is the same as the output value at the present time, the monitored-side comparing unit 2e sends a notice that a monitored-side keep alive signal is transmitted.

The output values of the monitored-side-random-number generating unit 2d are set not to have a correlation among the plurality of communication devices 2. In this case, two communication devices 2 always do not transmit monitored-side keep alive signals at the same timing. As a result, the receiving device 3 can grasp the communication device 2 in the incommunicable state.

As the simplest method, a uniform random number generator to which an independent seed is input may be used as the monitored-side-random-number generating unit 2d in each of the plurality of communication devices 2. For example, a pseudo random number generator implemented with a software such as a linear congruential method, Xorshift or the like may be used as the monitored-side-random-number generating unit 2d. For example, a hardware random number generator that uses thermal noise or the like may be used as the monitored-side-random-number generating unit 2d. For example, a cryptographically secure pseudo random number generator based on a hash function such as SHA may be used as the monitored-side-random-number generating unit 2d.

Note that a timing generator based on an operation state of the elevator 1 may be used as the monitored-side-random-number generating unit 2d. For example, a timing generator based on a present level floor of a car of the elevator 1 may be used as the monitored-side-random-number generating unit 2d. For example, a timing generator based on present acceleration of the car of the elevator 1 may be used as the monitored-side-random-number generating unit 2d. For example, a timing generator based on a cumulative number of times of start of the car of the elevator 1 may be used as the monitored-side-random-number generating unit 2d. For example, a timing generator based on a value of an electric current flowing to a hoisting machine of the elevator 1 may be used as the monitored-side-random-number generating unit 2d.

At this time, the elevators 1 adjacent to each other have similar output values. In this case, a pseudo random number generator using data on the operation state of the elevator 1 as a seed may be used as the monitored-side-random-number generating unit 2d.

A timing generator based on attributes of the elevator 1 may be used as the monitored-side-random-number generating unit 2d. For example, a timing generator based on a level floor of the elevator 1 and specifications of the elevator 1 such as speed may be used as the monitored-side-random-number generating unit 2d. For example, a timing generator based on a way of using the elevator 1 in a station, an office, or the like may be used as the monitored-side-random-number generating unit 2d.

The attributes of the elevator 1 causes a difference in a request for a frequency of keep alive monitoring. For example, in a station building, keep alive monitoring more frequent than in a condominium is necessary.

In the monitored-side-random-number generating unit 2d conforming to a specific distribution corresponding to the attributes of the elevator 1, S(x) conforming to a Gaussian distribution of an average μ and dispersion σ² is output. Specifically, S(x) is represented by the following Expression (1).

[Math. 1]

$$S(x) = \frac{1}{\sqrt{2\pi\sigma^2}} \exp\left(-\frac{(x-\mu)^2}{2\sigma^2}\right) \quad (1)$$

For example, in a specific property group such as condominiums, a parameter of an average 20 of the Gaussian distribution is given. For example, in another property group such station buildings, a parameter of an average 40 of the Gaussian distribution is given. As a result, it is possible to deviate generation times of monitored-side keep alive signals of a plurality of property groups to any time range. Note that the monitored-side keep alive signals may be transmitted at a high frequency by changing an interval of the generation times of the monitored-side keep alive signals.

An overview of the operation of the communication device 2 is explained with reference to FIG. 3.

Figure 3:
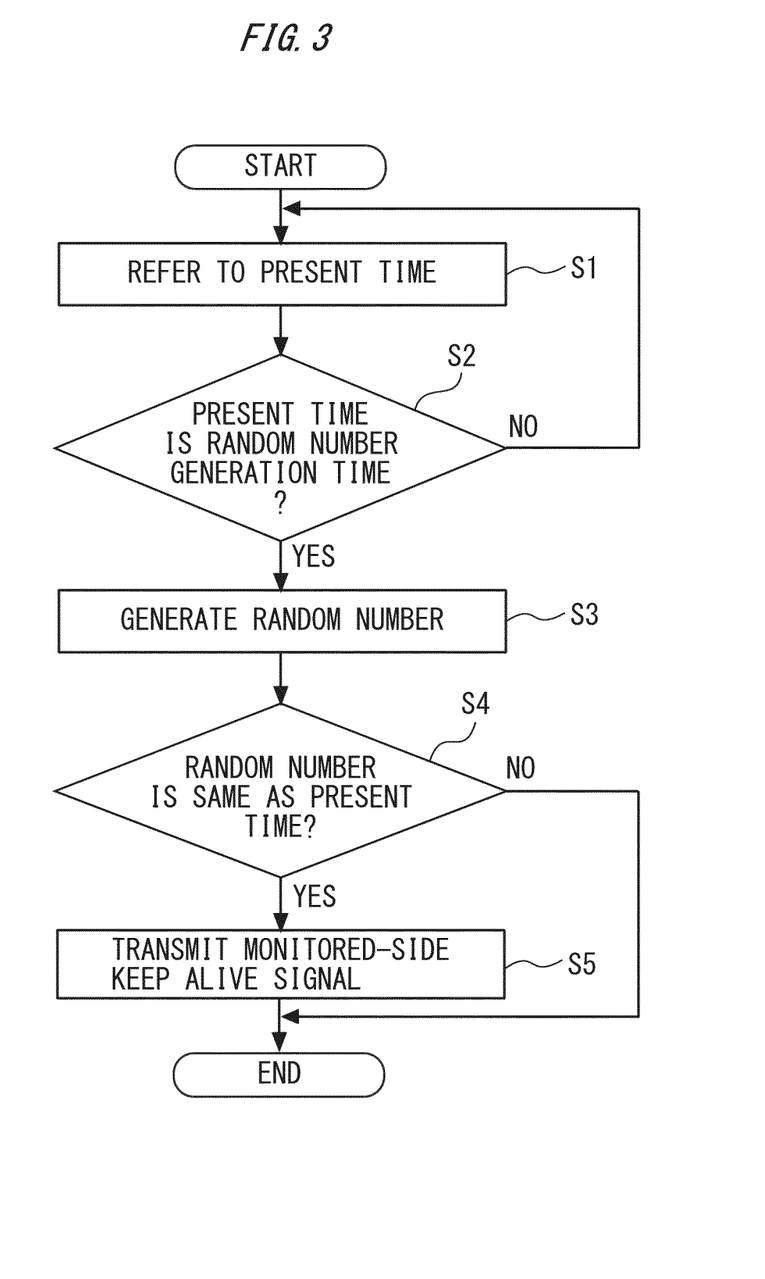
FIG. 3 is a flowchart for explaining an overview of the operation of the communication device of the monitoring system in the first embodiment.

FIG. 3 is a flowchart for explaining an overview of the operation of the communication device of the monitoring system in the first embodiment.

In step S1, the communication device 2 refers to present time. Thereafter, the communication device 2 performs operation in step S2. In step S2, the communication device 2 determines whether the present time is random number generation time.

If the present time is not the random number generation time in step S2, the communication device 2 performs the operation in step S1. If the present time is the random number generation time in step S2, the communication device 2 performs operation in step S3.

In step S3, the communication device 2 generates a random number. Thereafter, the communication device 2 performs operation in step S4. In step S4, the communication device 2 determines whether the random number is the same as the present time.

If the random number is not the same as the present time in step S4, the communication device 2 ends the operation.

If the random number is the same as the present time in step S4, the communication device 2 performs operation in step S5. In step S5, the communication device 2 transmits a monitored-side keep alive signal. Thereafter, the communication device 2 ends the operation.

An overview of the operation of the receiving device 3 is explained with reference to FIG. 4.

Figure 4:
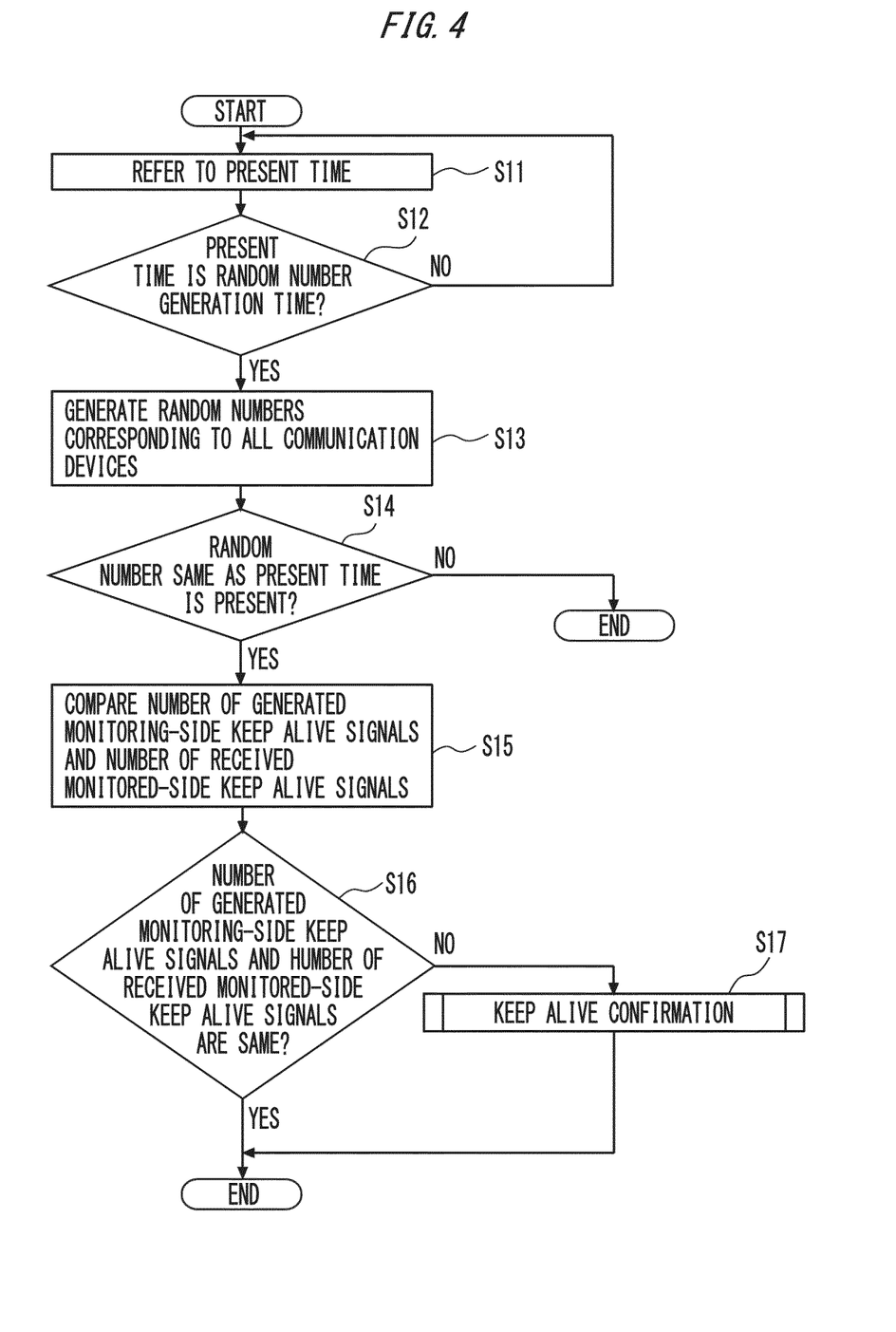
FIG. 4 is a flowchart for explaining an overview of the operation of a receiving device of the monitoring system in the first embodiment.

FIG. 4 is a flowchart for explaining an overview of the operation of the receiving device of the monitoring system in the first embodiment.

In step S11, the receiving device 3 refers to present time. Thereafter, the receiving device 3 performs operation in step S12. In step S12, the receiving device 3 determines whether the present time is random number generation time.

If the present time is not the random number generation time in step S12, the receiving device 3 performs the operation in step S11. If the present time is the random number generation time in step S12, the receiving device 3 performs operation in step S13.

In step S13, the receiving device 3 generates random numbers corresponding to all the communication devices 2. Thereafter, the receiving device 3 performs operation in step S14. In step S14, the receiving device 3 may determine whether a random number same as the present time is present.

If a random number same as the present time is absent in step S14, the receiving device 3 ends the operation.

If a random number same as the present time is present in step S14, the receiving device 3 performs operation in step S15. In step S15, the receiving device 3 compares the number of generated monitoring-side keep alive signals and the number of received monitored-side keep alive signals. Thereafter, the receiving device 3 performs operation in step S16. In step S16, the receiving device 3 determines whether the number of generated monitoring-side keep alive signals and the number of received monitoring-side keep alive signals are the same.

If the number of generated monitoring-side keep alive signals and the number of received monitored-side keep alive signals are the same in step S16, the receiving device 3 ends the operation.

If the number of generated monitoring-side keep alive signals and the number of received monitored-side keep alive signals are not the same in step S16, the receiving device 3 performs operation in step S17. In step S17, the receiving device 3 performs operation for keep alive confirmation. Thereafter, the receiving device 3 ends the operation.

According to the first embodiment explained above, the communication device 2 determines, by itself, timing for transmitting a monitored-side keep alive signal to the receiving device 3. At this time, the receiving device 3 determines a communication state of the communication device 2 based on presence or absence of reception of the monitored-side keep alive signal at the timing. Accordingly, it is possible to reduce an amount of data exchanged when the communication state of the communication device 2 is determined. As a result, it is possible to reduce a load on a network.

The monitored-side keep alive signal is generated at the timing. Accordingly, it is possible to suppress the monitored-side keep alive signal from being uselessly generated. As a result, it is possible to suppress wrong transmission of the monitored-side keep alive signal.

The timing is determined based on a uniform random number. Accordingly, it is possible to determine the timing with a simple configuration.

The timing is determined based on an operation state of the elevator 1 corresponding to the timing. Accordingly, it is possible to transmit the monitored-side keep alive signal at timing suitable for the elevator 1 corresponding to the timing.

The timing is determined based on attributes of the elevator 1 corresponding to the timing. Accordingly, it is possible to transmit the monitored-side keep alive signal at timing suitable for the elevator 1 corresponding to the timing.

Note that, if an output random number of the random-number generating unit conforms to a uniform distribution and timing is controlled in a unit of minute, a collision probability $P_c$ of collision that occurs because n communication devices 2 among N communication devices 2 generate monitored-side keep alive signals at the same time is represented by the following Expression (2) using a binomial distribution.

[Math. 2]

$$P_c = \binom{N}{n}\left(\frac{1}{60}\right)^n\left(1-\frac{1}{60}\right)^{N-n} \quad (2)$$

If only identification information is simply used, only two hundred fifty-six communication devices 2 can be monitored at most with one byte. However, according to this method, if the output random number of the random-number generating unit conforms to the uniform distribution, it is possible to, by allowing the collision probability $P_c$ of 0.37, increase the number of the communication devices 2 that can be monitored.

A probability $P_{nt}$ of a certain communication device 2 not transmitting a monitored-side keep alive signal for m minutes is represented by the following Expression (3).

[Math. 3]

$$P_{nt} = \left(1-\frac{1}{60}\right)^m \quad (3)$$

In this case, monitored-side keep alive signals are transmitted at a probability of approximately 0.64 in sixty minutes. In order to reduce an interval of the transmission of the monitored-side keep alive signals, an interval for generating random numbers only have to be reduced.

An example of the communication device 2 is explained with reference to FIG. 5.

Figure 5:
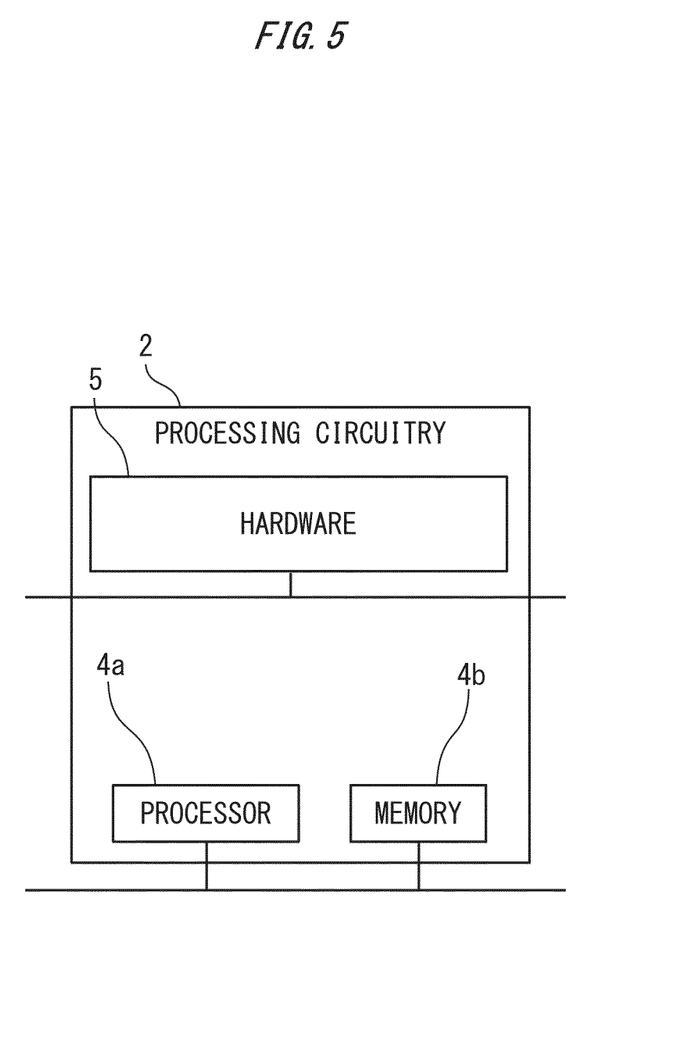
FIG. 5 is a hardware configuration diagram of the communication device of the monitoring system in the first embodiment.

FIG. 5 is a hardware configuration diagram of the communication device of the monitoring system in the first embodiment.

The functions of the communication device 2 can be implemented by processing circuitry. For example, the processing circuitry includes at least one processor 4a and at least one memory 4b. For example, the processing circuitry includes at least one dedicated hardware 5.

If the processing circuitry includes the at least one processor 4a and the at least one memory 4b, the functions of the communication device 2 are implemented by software, firmware, or a combination of the software and the firmware. At least one of the software and the firmware is described as a program. At least one of the software and the firmware is stored in the at least one memory 4b. The at least one processor 4a reads out and executes the program stored in the at least one memory 4b to thereby implement the functions of the communication device 2. The at least one processor 4a is referred to as a central processing unit, a processing device, an arithmetic device, a microprocessor, a microcomputer, or a DSP as well. For example, the at least one memory 4b is a nonvolatile or volatile semiconductor memory such as a RAM, a ROM, a flash memory, an EPROM, or an EEPROM, a magnetic disk, a flexible disk, an optical disk, a compact disk, a minidisk, a DVD, or the like.

If the processing circuitry includes the at least one dedicated hardware 5, the processing circuitry is implemented by, for example, a single circuit, a composite circuit, a programmed processor, a parallel-programmed processor, an ASIC, an FPGA, or a combination of the single circuit, the composite circuit, the programmed processor, the parallel-programmed processor, the ASIC and the FPGA. For example, respective functions of the communication device 2 are respectively implemented by processing circuitry. For example, the functions of the communication device 2 are collectively implemented by processing circuitry.

A part of the functions of the communication device 2 may be implemented by the dedicated hardware 5 and the other part of the functions may be implemented by software or firmware. For example, the function of the monitored-side-random-number generating unit 2d may be implemented by processing circuitry functioning as the dedicated hardware 5. The functions other than the function of the monitored-side-random-number generating unit 2d may be implemented by the at least one processor 4a reading out and executing a program stored in the at least one memory 4b.

In this way, the processing circuitry implements the functions of the communication device 2 with the hardware 5, the software, the firmware, or a combination of the hardware 5, the software and the firmware.

Although not illustrated, the functions of the receiving device 3 are also implemented by processing circuitry equivalent to the processing circuitry that realizes the functions of the communication device 2.

Second Embodiment

Figure 6:
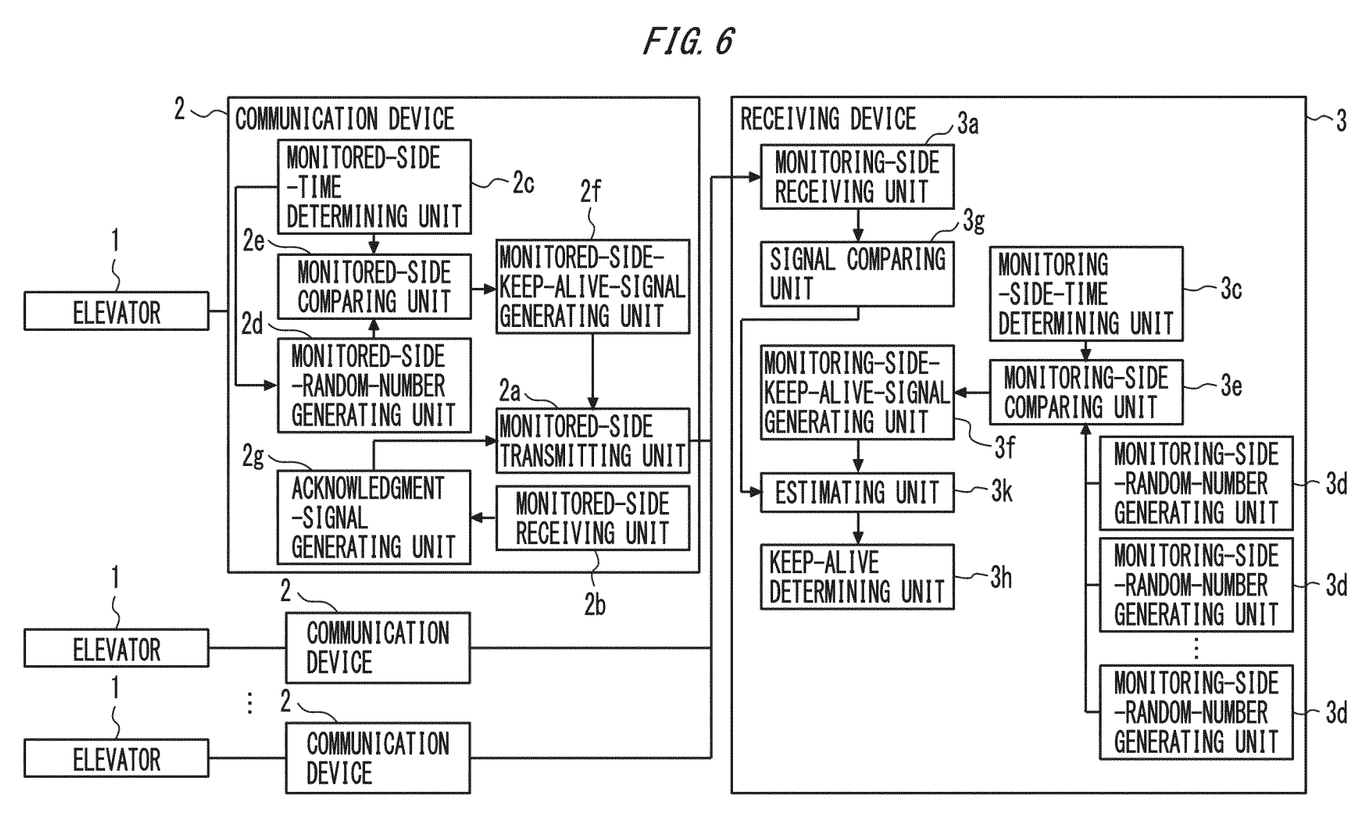
FIG. 6 is a configuration diagram of a monitoring system in the first embodiment in a second embodiment.

FIG. 6 is a configuration diagram of a monitoring system in the first embodiment in a second embodiment. Note that parts same as or equivalent to the parts in the first embodiment are denoted by the same reference numerals and signs. Explanation of the parts is omitted.

In the second embodiment, the receiving device 3 does not include the monitoring-side transmitting unit 3b, the relevant-device confirming unit 3i and the confirmation-signal generating unit 3j. The receiving device 3 includes an estimating unit 3k.

When the monitoring-side-keep-alive-signal generating unit 3f simultaneously generates a plurality of monitoring-side keep alive signals, if the number of received monitored-side keep alive signals is smaller than the number of the generated monitoring-side keep alive signals, the estimating unit 3k estimates the communication device 2 in an incommunicable state based on a comparison result of the number of monitoring-side keep alive signals generated thereafter and the number of monitored-side keep alive signals received thereafter. For example, the estimating unit 3k estimates the communication device 2 in the incommunicable state based on a graph theory.

An estimation method for the communication device 2 in the incommunicable state is explained with reference to FIG. 7.

Figure 7:
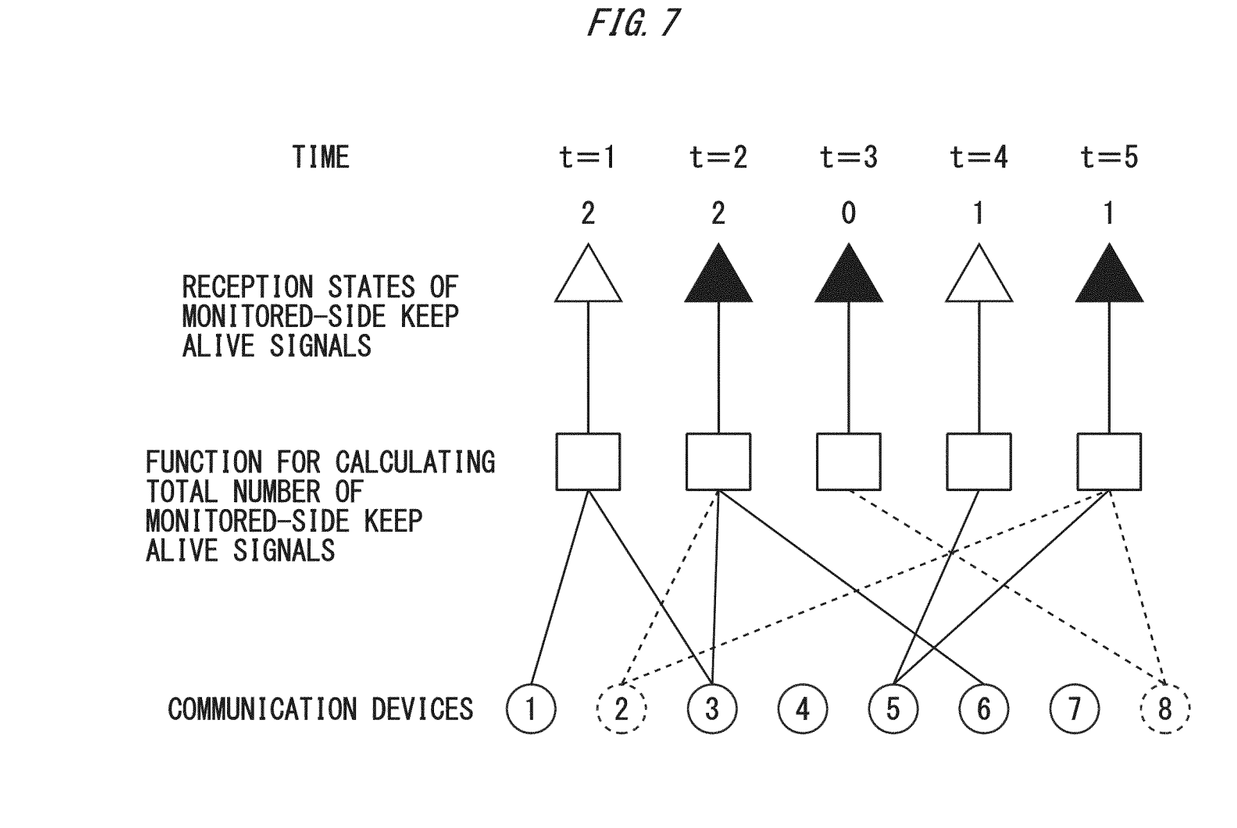
FIG. 7 is a diagram for explaining an estimation method for a communication device in an incommunicable state by a receiving device of the monitoring system in the second embodiment.

FIG. 7 is a diagram for explaining an estimation method for the communication device in the incommunicable state by the receiving device of the monitoring system in the second embodiment.

In FIG. 7, circles on the lower side are nodes representing the communication devices 2. Solid lines represent the communication devices 2 in a communicable state. Doted lines represent the communication devices 2 in the incommunicable state. Squares are function nodes for calculating a total number of monitored-side keep alive signals received at a relevant time. Triangles are nodes representing reception states of the monitored-side keep alive signals. White represents a state in which all of monitored-side keep alive signals that should be received are received. Black represents a state in which not all of the monitored-side keep alive signals that should be received are received.

For example, if time t is "1", the communication device 2 of "1" and the communication device 2 of "3" transmit monitored-side keep alive signals. These monitored-side keep alive signals are correctly received. At this time, the number of received packets and the number of connections of graphs coincide. It is determined that the communication device 2 of "1" and the communication device 2 of "3" are in the communicable state.

For example, if the time t is "2", whereas the communication device 2 of "2", the communication device 2 of "3", and the communication device 2 of "6" should transmit monitored-side keep alive signals, the communication device 2 of "2" does not transmit a monitored-side keep alive signal. In this case, an abnormality is detected. At this point in time, among the communication device 2 of "2", the communication device 2 of "3", and the communication device 2 of "6", the communication device 2 in the incommunicable state cannot be estimated.

For example, if the time t is "3", whereas the communication device 2 of "8" should transmit a monitored-side keep alive signal, the communication device 2 of "8" does not transmit a monitored-side keep alive signal. In this case, an abnormality is detected. At this point in time, it is determined that the communication device 2 of "8" is in the incommunicable state.

When the time t progresses to "5", based on the communication devices 2 that should transmit monitored-side keep alive signals up to this point in time and the number of received packets, it is estimated that the communication device 2 in the incommunicable state when the time t is "2" is the communication device 2 of "2".

According to the second embodiment explained above, if the number of received monitored-side keep alive signal is smaller than the number of generated monitoring-side keep alive signals, the receiving device 3 estimates the communication device 2 in the incommunicable state based on a comparison result of the number of monitoring-side keep alive signals generated thereafter and the number of monitored-side keep alive signals received thereafter. Specifically, the receiving device 3 estimates the communication device 2 in the incommunicable state based on the graph theory. Accordingly, it is possible to specify the communication device 2 in the incommunicable state without transmitting a confirmation signal.

Third Embodiment

Figure 8:
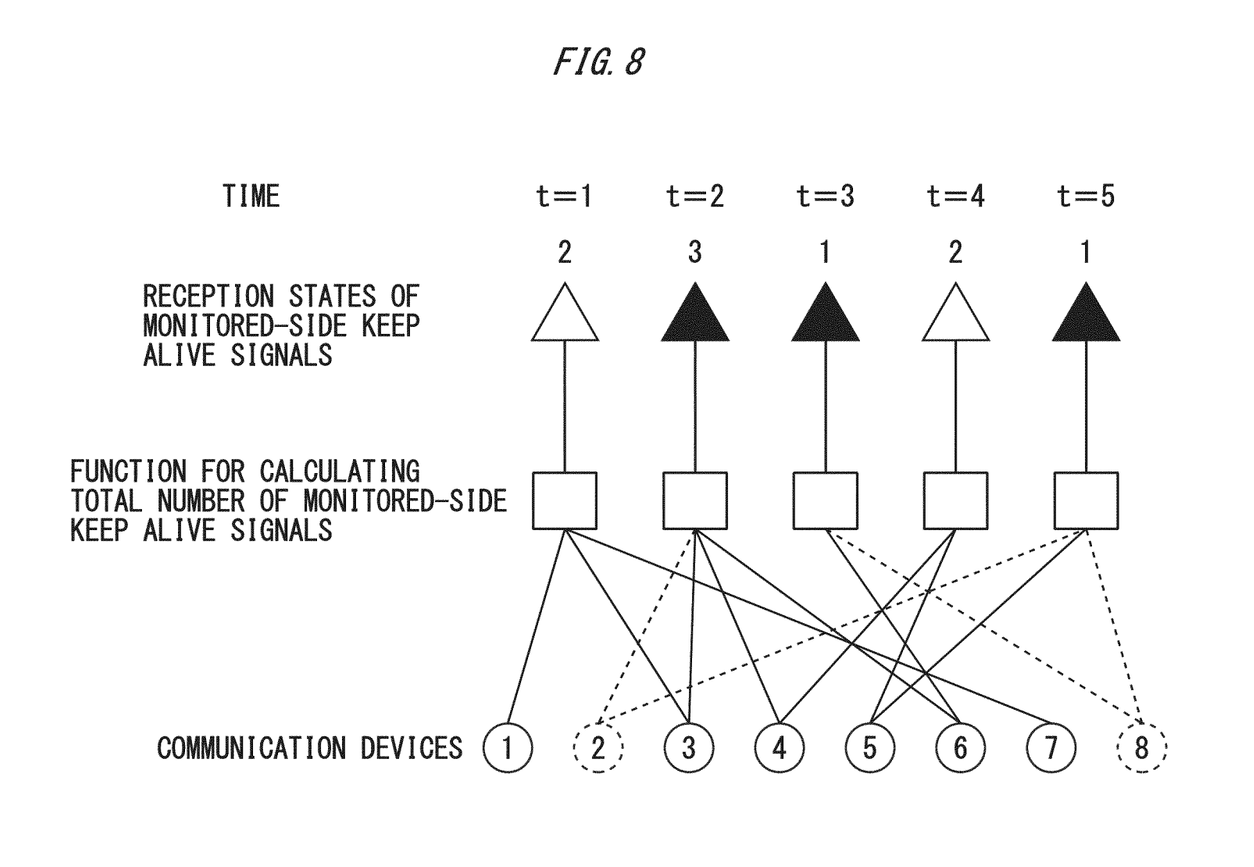
FIG. 8 is a diagram for explaining an estimation method for a communication device in an incommunicable state by a receiving device of a monitoring system in a third embodiment.

FIG. 8 is a diagram for explaining an estimation method for a communication device in an incommunicable state by a receiving device of a monitoring system in a third embodiment. Note that parts same as or equivalent to the parts in the second embodiment are denoted by the same reference numbers and signs. Explanation of the parts is omitted.

In the receiving device 3 in the third embodiment, the estimating unit $3k$ estimates the communication device 2 in an incommunicable state based on compressed sensing, which is a method of estimating a high-dimension vector (sparse vector) with a large number of zero elements in the number of observations smaller than the number of dimensions of the vector.

An estimation target sparse vector x is represented by the following Expression (4).

[Math. 4]

$$x \in \mathbb{R}^N \qquad (4)$$

An observation vector y is represented by the following Expression (5).

[Math. 5]

$$y \in \mathbb{R}^M \qquad (5)$$

where, M is smaller than n.

At this time, an M×N matrix A used for the estimation of the sparse vector x is represented by the following Expression (6).

[Math. 6]

$$A \in \mathbb{R}^{M \times N} \qquad (6)$$

A relation among the sparse vector x, the observation vector y, and the M×N matrix A is represented by the following Expression (7).

[Math. 7]

$$y = Ax \qquad (7)$$

At this time, the estimating unit $3k$ solves the following Expression (8) in order to estimate the vector x.

[Math. 8]

$$\hat{x} = \mathrm{argmin}_{x'} \|Ax' - y\|_2^2 + \lambda \|x'\|_1 \qquad (8)$$

Here, the following Expression (9) represents a norm.

[Math. 9]

$$\|\cdot\|_p \qquad (9)$$

When p is larger than 0, the following Expression (10) holds.

[Math. 10]

$$\|b\|_p \equiv \left( \sum_{i=1}^{N} |b_i|^p \right)^{\frac{1}{p}} \qquad (10)$$

When p is 0, the norm is represented by the following Expression (11).

[Math. 11]

$$\|b\|_0 \qquad (11)$$

In Expression (11), the norm represents the number of nonzero elements of the vector b.

In the receiving device 3, a signal y to be received represents the number of monitored-side keep alive signals received in a certain time period and x represents an operation state of the communication device 2. For example, if the communication device 2 is in the communicable state, x is nonzero. If the communication device 2 is in the incommunicable state, x is zero.

In FIG. 8, keep alive states of eight communication devices 2 are estimated from five observation states. At this time, signal input and output in this case is represented by the following Expression (12).

[Math. 12]

$$\begin{bmatrix} 2 \\ 3 \\ 1 \\ 2 \\ 1 \end{bmatrix} = \begin{bmatrix} 1 & 1 & 0 & 0 & 0 & 0 & 1 & 0 \\ 0 & 1 & 1 & 1 & 0 & 1 & 0 & 0 \\ 0 & 0 & 0 & 0 & 0 & 1 & 0 & 1 \\ 0 & 0 & 0 & 1 & 1 & 0 & 0 & 0 \\ 0 & 1 & 0 & 0 & 1 & 0 & 0 & 1 \end{bmatrix} \begin{bmatrix} 1 \\ 0 \\ 1 \\ 1 \\ 1 \\ 1 \\ 1 \\ 0 \end{bmatrix} \quad (12)$$

However, in Expression (12), most of elements of a vector desired to be estimated are nonzero elements. Accordingly, Expression (12) is not a problem for solving compressed sensing. In an actual system, a situation in which the communication devices 2 in the incommunicable state occupy a majority less easily occurs. Most of the communication devices 2 are in the communicable state. Therefore, in order to make the estimation vector sparse, for convenience, zero represents the communicable state and nonzero represents the incommunicable state. However, a true vector is unknown for an observer. This is inconsistent with the number of observation signals. Therefore, the number of signals that should be received at a point in time t is represented as $r_t$. An element of a new observation vector is defined by the following Expression (13).

[Math. 13]

$$\bar{y}_i = r_i - y_i \quad (13)$$

As a result, the signal input and output is converted into the following Expression (14).

[Math. 14]

$$\begin{bmatrix} 1 \\ 1 \\ 1 \\ 0 \\ 2 \end{bmatrix} = \begin{bmatrix} 1 & 1 & 0 & 0 & 0 & 0 & 1 & 0 \\ 0 & 1 & 1 & 1 & 0 & 1 & 0 & 0 \\ 0 & 0 & 0 & 0 & 0 & 1 & 0 & 1 \\ 0 & 0 & 0 & 1 & 1 & 0 & 0 & 0 \\ 0 & 1 & 0 & 0 & 1 & 0 & 0 & 1 \end{bmatrix} \begin{bmatrix} 0 \\ 1 \\ 0 \\ 0 \\ 0 \\ 0 \\ 0 \\ 1 \end{bmatrix} \quad (14)$$

The estimating unit 3k grasps the number of signals that should be truly received. Accordingly, the estimating unit 3k calculates the left side from the number of actually received signals. A conversion matrix is also known because a random number generator is shared. Accordingly, the estimating unit 3k makes an operation state vector of the right side sparse and then treats the operation state vector as an estimation problem of compressed sensing.

According to the third embodiment explained above, the receiving device 3 estimates the communication device 2 in the incommunicable state based on the compressed sensing.

In this case as well, it is possible to specify the communication device 2 in the incommunicable state without transmitting a confirmation signal.

Note that the communication device 2 in the incommunicable state may be estimated based on a pseudo inverse matrix. In this case as well, it is possible to specify the communication device 2 in the incommunicable state without transmitting a confirmation signal.

INDUSTRIAL APPLICABILITY

As explained above, the receiving device according to the present invention can be used in an elevator system.

REFERENCE SIGNS LIST

1 elevator
2 communication device
2a monitored-side transmitting unit
2b monitored-side receiving unit
2c monitored-side-time determining unit
2d monitored-side-random-number generating unit
2e monitored-side comparing unit
2f monitored-side-keep-alive-signal generating unit
2g acknowledgment-signal generating unit
3 receiving device
3a monitoring-side receiving unit
3b monitoring-side transmitting unit
3c monitoring-side-time determining unit
3d monitoring-side-random-number generating unit
3e monitoring-side comparing unit
3f monitoring-side-keep-alive-signal generating unit
3g signal comparing unit
3h keep-alive determining unit
3i relevant-device confirming unit
3j confirmation-signal generating unit
3k estimating unit
4a processor
4b memory
5 hardware

The invention claimed is:

1. A receiving device comprising:
   processing circuitry
   to determine timings for generating a plurality of monitoring-side keep alive signals at same timings as timings when a plurality of communication devices transmit monitored-side keep alive signals,
   to generate the plurality of monitoring-side keep alive signals at the plurality of timings determined, without transmitting the generated plurality of monitoring-side keep alive signals to the plurality of communication devices, and
   to estimate that a communication device is in an incommunicable state without transmitting the generated plurality of monitoring-side keep alive signals to the plurality of communication devices and based on a comparison result of a number of the monitoring-side keep alive signals generated by the receiving device thereafter and a number of monitored-side keep alive signals received from the plurality of communication devices thereafter when the plurality of monitoring-side keep alive signals are generated, if the number of the received monitored-side keep alive signals is smaller than the number of the generated monitoring-side keep alive signals.

2. The receiving device according to claim 1, wherein, when the plurality of monitoring-side keep alive signals are simultaneously generated, if the number of the received monitored-side keep alive signals is smaller than a number of all monitored terminals that should be monitored, the processing circuitry estimates that the communication device is in the incommunicable state based on a graph theory which produces a comparison result of a number of monitoring-side keep alive signals generated before and after the generation of the plurality of monitoring-side keep alive signals and a number of monitored-side keep alive signals received before and after the generation of the plurality of monitoring-side keep alive signals.

3. The receiving device according to claim 1, wherein, when the plurality of monitoring-side keep alive signals are simultaneously generated, if the number of the received monitored-side keep alive signals is smaller than a number of all monitored terminals that should be monitored, the processing circuitry estimates that the communication device is in the incommunicable state based on compressed sensing using a conversion matrix including a comparison result of a number of monitoring-side keep alive signals generated before and after the generation of the plurality of monitoring-side keep alive signals and a number of monitored-side keep alive signals received before and after the generation of the plurality of monitoring-side keep alive signals and timing generation information.

* * * * *